US012509269B1

(12) United States Patent
McCabe

(10) Patent No.: US 12,509,269 B1
(45) Date of Patent: Dec. 30, 2025

(54) WASTE COMPACTING BAG SUPPORT AND PROTECTOR

(71) Applicant: James K. McCabe, Glendale, AZ (US)

(72) Inventor: James K. McCabe, Glendale, AZ (US)

( * ) Notice: Subject to any disclaimer, the term of this patent is extended or adjusted under 35 U.S.C. 154(b) by 0 days.

(21) Appl. No.: 18/955,485

(22) Filed: Nov. 21, 2024

(51) Int. Cl.
*B65F 1/14* (2006.01)
*B65B 67/12* (2006.01)

(52) U.S. Cl.
CPC ........ *B65B 67/1238* (2013.01); *B65F 1/1415* (2013.01); *B65F 2230/15* (2013.01); *B65F 2240/138* (2013.01)

(58) Field of Classification Search
CPC ............... B65B 67/1238; B65F 1/1415; B65F 2230/15; B65F 2240/138
See application file for complete search history.

(56) References Cited

U.S. PATENT DOCUMENTS 176,555 A * 4/1876 Scholfield ............... B65B 67/12 141/390
3,997,072 A * 12/1976 Guth ......................... B65F 1/12 141/390
4,014,157 A * 3/1977 Pearce .................. B65F 1/1415 141/390
4,200,127 A * 4/1980 Dunleavy ........... B65B 67/1238 141/10
4,842,228 A * 6/1989 Kasper .................. B65F 1/1415 220/908
5,358,138 A * 10/1994 Karwoski ............. B65F 1/1468 108/26
5,597,022 A * 1/1997 Reifers ..................... B65F 1/06 141/390
5,871,037 A * 2/1999 Feldt ......................... B65F 1/10 141/390
5,915,768 A * 6/1999 Young ..................... B65B 67/12 15/257.1
D417,761 S * 12/1999 Young .............................. D34/1
6,109,002 A 8/2000 McCabe
6,131,759 A * 10/2000 Young ....................... B65F 1/10 220/495.11
(Continued)

FOREIGN PATENT DOCUMENTS

DE 102014111491 A1 * 2/2016 ......... B65B 67/1233
GB 2410676 A * 8/2005 ................ B65F 1/06
(Continued)

*Primary Examiner* — Taylor Morris
(74) *Attorney, Agent, or Firm* — Bycer & Marion, PLC; Matthew L. Bycer

(57) ABSTRACT

A shell protects a plastic or paper bag as waste is set therein and allows compacting without harm to the bag. A concentric and conical shield with a toroidal bulge or extended belt has an upper shield opening and a lower shield opening, and a securable base. The shield separates the bag from compacted waste. The base cooperates with the shield to support the bag and its contents. The bag is placed over an upturned shield, the lower opening of the shield being secured to the base at an interface. The shield with bag emplaced thereon, can then be returned right-side up to allow filling of bag. Compacted waste rests on the bottom of the bag, which may be supported by the base. When the bag has become filled with waste, the shield may be removed from within the bag, while the bulge ensures the bag remains upright.

13 Claims, 11 Drawing Sheets

(56) References Cited

U.S. PATENT DOCUMENTS

| | | | | |
|---|---|---|---|---|
| 6,253,949 | B1 * | 7/2001 | Dickson | B65F 1/06<br>220/495.11 |
| 7,913,871 | B2 * | 3/2011 | Fisher | B65F 1/1468<br>220/495.11 |
| 8,322,663 | B2 * | 12/2012 | Bosik | B65F 1/1415<br>248/97 |
| 8,511,895 | B2 * | 8/2013 | Burchfield | B65F 1/1415<br>383/33 |
| 8,714,402 | B2 * | 5/2014 | Touchet | B29C 66/30223<br>220/613 |
| 2021/0387799 | A1 * | 12/2021 | Christian | B65F 1/125 |

FOREIGN PATENT DOCUMENTS

| | | | | | |
|---|---|---|---|---|---|
| GB | 2510113 | A | * | 7/2014 | B65B 67/1238 |
| KR | 20080003533 | A | * | 1/2008 | B65F 1/1415 |
| KR | 20090046372 | A | * | 5/2009 | B65F 1/14 |
| KR | 200446854 | Y1 | * | 12/2009 | B65F 1/16 |
| WO | WO-2006071923 | A2 | * | 7/2006 | B65F 1/1468 |

* cited by examiner

WASTE COMPACTING BAG SUPPORT AND PROTECTOR

BACKGROUND OF THE INVENTION

1. Field of the Invention

The present invention relates to debris and waste management systems, and more particularly to a system and method for containing yard and organic waste.

2. Description of Related Prior Art

Many types of loose waste, including yard waste such as leaves and trimmed branches from trees, may be compacted to occupy a significantly reduced volume. Such waste can be compacted easily by hand when disposed of in a rigid receptacle. For example, people typically compact yard waste simply by compressing the waste in a barrel to make room for additional yard waste. Compacting such waste is desirable because space is conserved (1) in the receptacle and (2) in whatever larger receptacle is used to transport the waste to its ultimate destination. More waste may be processed per unit volume when it has been compacted than if it is left in an uncompacted state.

A person handling loose waste, such as a yard worker, often chooses disposable or compostable flexible bags, often of plastic or paper, for waste disposal instead of a more permanent rigid receptacle. Many municipalities require such waste to be bagged.

It is desirable for loose waste to be compacted when it is disposed of in flexible bags. The benefits noted above could be obtained, as well as a reduction in the number of bags required to contain a given amount of waste. However, flexible bags tear easily when certain types of waste, such as tree branches or aluminum cans, are compacted inside them.

James K. McCabe invented an apparatus and method for supporting and protecting a bag during compacting of waste as described in U.S. Pat. No. 6,109,002 which elegantly resolves the issue to protect the flexible bag in the rigid container. However, the invention may be improved by providing a more ergonomic and facile mode of removal of the protective shield.

It is therefore a primary object of the present invention to provide an improved system and method for managing debris.

These and other objects of the present invention will become apparent to those skilled in the art as the description thereof proceeds.

SUMMARY OF THE INVENTION

An apparatus according to the present invention protects a bag so that waste may be compacted into the bag. Such an apparatus includes a shield having an upper shield opening, a lower shield opening, and a base. The shield may be shaped as a concentric conical section and may include a sidewall shaped to extended the diameter midway to a length equal to the diameter of the largest end. A bulge or belt or otherwise may be set in the sidewall, preferably, at or below the midpoint. The bulge may be rounded (e.g. toroidal) or include conical paneling (with edges). The base is constructed so that it may be secured, in a releasable fashion, to the lower shield opening. The shield substantially protects the bag from abrasion by compacted waste. The base cooperates with the shield to support the bag and its contents. The base prevents substantial contact between the bag and the surface on which the base rests. The base also supports the bottom of the bag when waste is compacted into the bag.

In operation, the bag is emplaced over an inverted shield. Then, the lower opening of the shield (being upright) may be secured to the base at an interface. The bag extends across the base and provides a reliable mechanical interface between the durable portions of the apparatus, the base and the lower shield opening. The bulge of the bag extends outwardly to the width of the lower opening and interfaces with the bag. The system may then be flipped and rectified, allowing the upper opening to provide for a passage into the bag with the shield protecting the inside thereof. When the waste receptacle is filled, the base may be disengaged, and the shield may be lifted, as by handles or otherwise, while the bag is retained in place. The outer surface of the bulge(s) interface with the bag and the weight of the waste material holds the bag down and the shield is lifted. The bulge ensures constant contact with the bag around the circumference of the shield and ensures that the bag remains upright to contain the waste material. The bag may be replaced each time the durable portions of the apparatus are separated, so it is not affected by long-term abrasive wear from repeated mechanical connections.

Compacted waste rests on the bottom of the bag, which is supported by the base below. The shield does not bear any of the weight of the compacted waste (apart from lateral pressures). When the shield is removed, the weight of the compacted waste provides a downward force on the base, with the bottom of bag pinned thereby. When the bag has become suitably filled with waste, this downward force helps to keep the base stationary while the shield is removed—leaving the filled bag on the base. The bag then may be tied, sealed, or otherwise enclosed for storage, removal, transport, etc.

In a preferred variation, the shield is tapered to be narrower at its top. A tapered shield tends to move more easily away from compacted waste. A number of tapered shields may be stacked together during storage and/or shipment.

A shell protects a plastic or paper bag as waste is set therein and allows compacting without harm to the bag. A concentric and conical shield with a toroidal bulge or extended belt has an upper shield opening and a lower shield opening, and a securable base. The shield separates the bag from compacted waste. The base cooperates with the shield to support the bag and its contents. The bag is placed over an upturned shield, the lower opening of the shield (now lifted and directed upwards) being secured to the base at an interface. The bag may be pinned between the shield and base, and secured with ring. The shield with bag emplaced thereon, can then be returned right-side up to allow filling of bag. Compacted waste rests on the bottom of the bag, which may be supported by the base. When the bag has become filled with waste, the shield may be removed from within the bag, while the bulge ensures the bag remains upright.

An embodiment includes an apparatus for supporting a bag on a surface and for protecting the bag during compacting of waste into the bag, with a shield having an upper shield opening and a lower shield opening, and a central body with a circumferential bulge expanding a local diameter of the shield. The shield may be set over a base and secured together with a releasable ring clip, which includes a latch, for securing the base, in a releasable fashion, to the lower shield opening. The ring clip may be circular and/or channeled. The circumferential bulge may be set at least two inches above the lower shield opening, more preferably at least six inches. The bulge may include a vertical or extending wall that may be at least six inches high. The circumferential bulge may extend the local diameter to at least a diameter of the lower opening, if not as much as to at least a diameter of a flange or lower lip. The bulge may include a vertical cylindrical face bounded by an upper angular conical sectional wall and a lower conical sectional wall, offset from the main shield flat surface at an angle of twenty to forty-five degrees. Alternatively, the bulge may present as a toroidal section with a rounded nature wherein the extent of the bulge at its greatest circumference provides an outward surface or diameter equal or greater than an extended lip at lower end, the extended lip otherwise providing the largest diameter of the shield/shell. The bulge may be fitted onto a solid shall or present as a deformation of the shell wall. A cap or lid may be placed over the upper opening.

An embodiment may also include a system for supporting a bag on a surface and for protecting the bag during compacting of waste into the bag. The system may include a shield having an upper shield opening and a lower shield opening, and a central body with a circumferential bulge expanding a local diameter of the shield. A bag may be positioned outside the shield such that the shield is at least partially inside the bag. A base may be adapted to be secured to the lower shield opening in a releasable fashion and positioned outside the bag. A releasable ring clip, including latch, the clip securing the base, in a releasable fashion, to the lower shield opening. The ring clip may be circular and/or channeled. The circumferential bulge may be set at least two inches above the lower shield opening, more preferably at least six inches. The bulge may include a vertical or extending wall that may be at least six inches high. The circumferential bulge may extend the local diameter to at least a diameter of the lower opening, if not as much as to at least a diameter of a flange or lower lip.

BRIEF DESCRIPTION OF THE DRAWINGS

Embodiments of the present invention will now be further described with reference to the drawing, wherein like designations denote like elements and.

DESCRIPTION OF PREFERRED EXEMPLARY EMBODIMENTS

Figure 1:
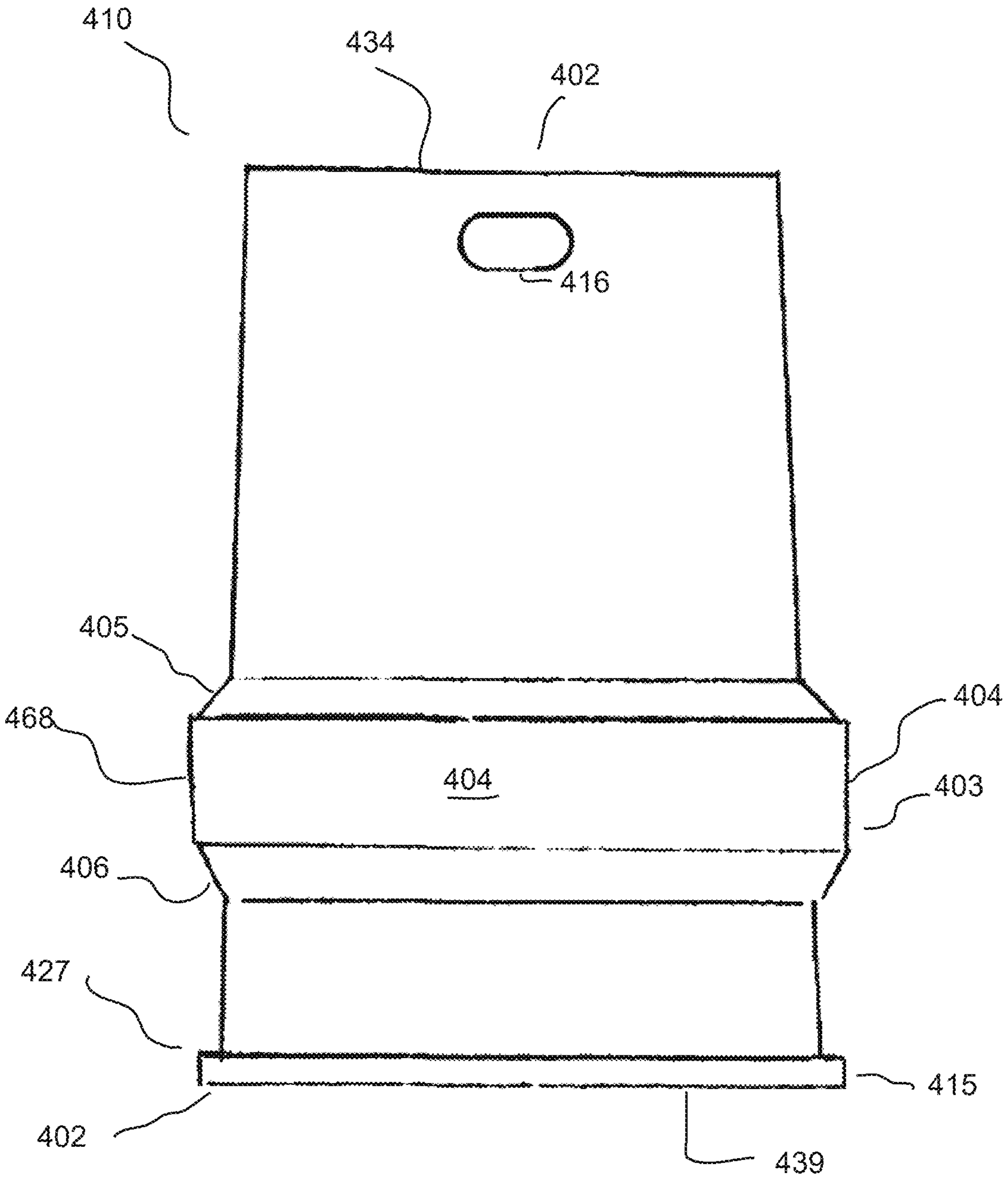
FIG. 1 is a side view of an embodiment of a bin used to compact leaves into a bag.

An apparatus for supporting and protecting a bag during compacting of waste into the bag includes a shield and a base. Any suitable shield that has an upper shield opening and a lower shield opening may be used to substantially protect the bag from abrasion by compacted waste. Waste is inserted into a bag (in which the shield is placed) through the upper shield opening. Any suitable base may be used to support the shield and bag. A suitable base is capable of being secured to the lower shield opening in a releasable fashion so that the base may be (1) secured to the shield while the apparatus is in use and (2) removed from the shield when the bag is to be replaced. The present disclosure includes improvements to U.S. Pat. No. 6,109,002 to James K. McCabe issued Aug. 29, 2000 to the same inventor, herein incorporated by reference and serves as the foundation upon which this improved disclosure presents. The prior embodiment may suffer when the bag set thereover would fall downwards around the shield and would be required to be temporarily coupled near the handles or top edge to prevent the bag from falling while yardwork was accomplished. The coupling would be disengaged for the removal of the shield, but otherwise presented an unnecessary step that can be resolved with the enhanced bulge feature of the present disclosure. With the shields of the present disclosure, the bag is free to drop while being filled, down to the bulge, which when ready, the shield may be lifted and thereby drag the bag up around the bulge (preferably with a diameter equal to or greater than the widest section of the shield) the bulge serving to drag the bag walls back up into place to allow for containment of waste and sealing.

According to the invention, any suitable shield and any suitable base may be secured to each other to support and protect a bag during compacting of waste into the bag. Shield 410, shown in FIG. 1, has a tapered cylindrical shape. Accordingly, upper shield opening 434 (defined by rim 413) is smaller in area than lower shield opening 439. Lower shield opening 434 is sized to pass into the open mouth of conventional waste bag, and preferably has a radius in a range from about sixteen inches to about twenty-four inches. In a variation, a larger or smaller size may be used. An exemplary embodiment of the shield will include a conical or tapered cylindrical body as shown in the respective figures. While shown with circular rounded shield bodies, other body types, including elliptical, rectangular or square bodies may suffice for a variety of bags, including plastic and paper waste bags. The top preferably includes a diameter of about fifteen to nineteen inches, preferably between sixteen and eighteen inches and preferably seventeen inches. The lower end preferably includes a diameter of nineteen to twenty-four inches, more preferably twenty to twenty-three inches, and most preferably about twenty and ½ or ¾ inches. The ratio of the lower end to upper end diameters is preferably seventy to eighty five percent, and most preferably eighty-one to eighty-three percent, with a preferred embodiment shown with ratio 1:1.22. The height of the system may vary, but a preferred height is about twenty-eight to thirty-five inches, and most preferably thirty inches give or take two inches. The height of the beginning of any curvature or change of the slope from the cylindrical body above the bottom lip at lower end is at least two inches, and more preferably six to eight inches. The height of the bulge is preferably at least six inches to secure the vertical element of the bag set thereover to enhance the pull function to capture and drag the bag up when removing the shield.

Figure 5:
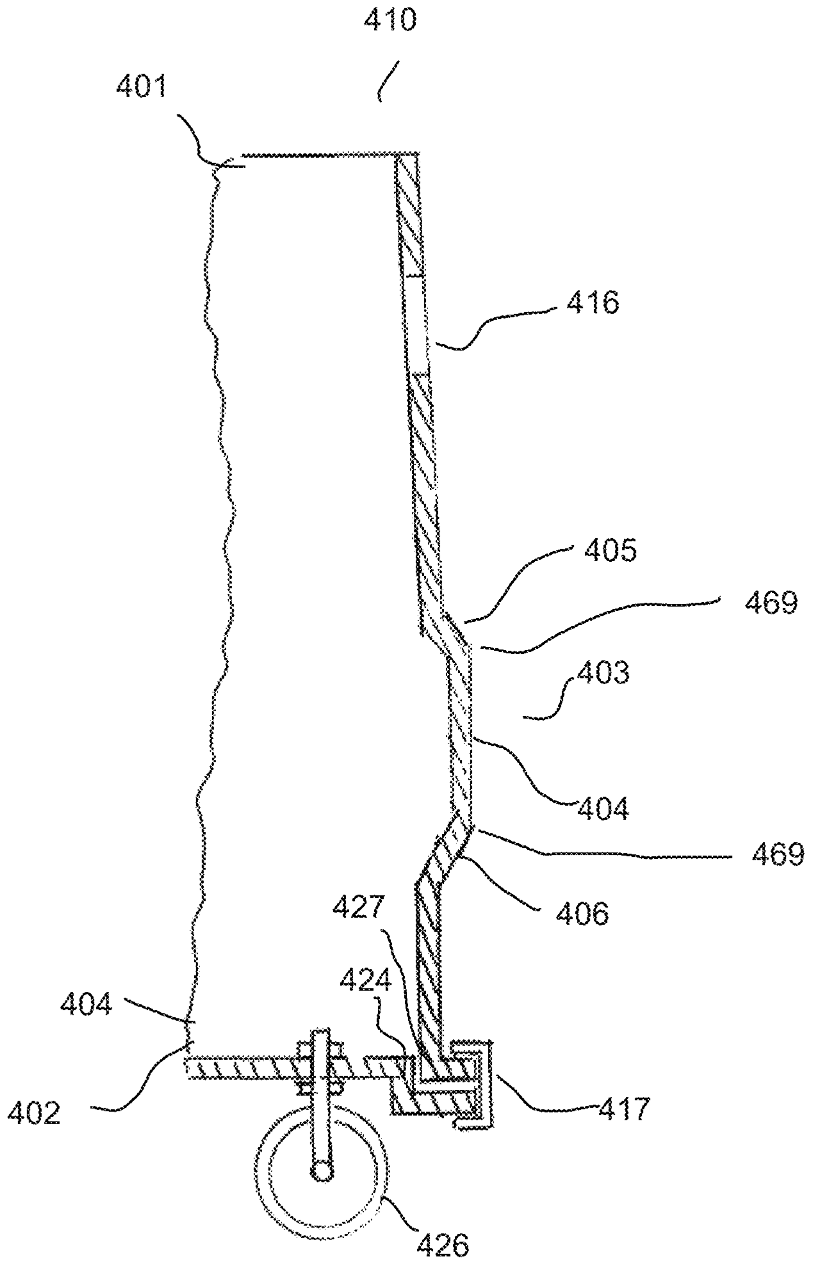
FIG. 5 shows cutaway side view of the lower portion of a bin system of the present invention.

Lower shield opening 439 is defined by a rim 413 having an outward-extending lip 427. Base 414 has a similar outward-extending lip 424. Lip 424 of base 414 is sized to receive the bottom surface of lip 427 of shield 410. As shown in FIG. 5, lip 427 of shield 410 and lip 424 of base 414 may be secured together in a releasable fashion by clip ring 417.

A shield may be suitably sized so that a lower shield opening is at approximately waist height when the shield is inverted. Accordingly, it may be more convenient for some users to place a base of the invention onto such a shield while the shield is in an inverted position. For example, base 414 may be placed onto inverted shield 410. Clip ring 417 may then be placed onto lip 415 and base coupling lip 424. Apparatus 400, having shield 410 and base 414 thus secured together, may then be inverted to an upright position.

The tapered cylindrical shape of shield 410 is advantageous in that it tends to move more easily away from compacted waste. In addition, a number of tapered shields may be stacked together during storage and/or shipment. These advantages may be obtained with any suitable tapered shield. Upper shield opening 434 is suitably sized large enough for receiving waste into the bag while remaining smaller in area than lower shield opening 439.

Shield 410, base 414, and clip ring 417 may be produced by modifying a conventional thirty-gallon blue poly drum. The bottom of such a drum may be cut off to form upper shield opening 434. Material may be removed from near the bottom of the drum to form handles 416. The lid of the drum may be used as base 414. A ring provided with the drum may be modified to be used as clip ring 417.

Any suitable base may be secured to any suitable shield, examples of which have been described above, to support and protect the bag during compacting of waste into the bag. Any suitable clip ring may be used to secure a shield and a base of the present invention together. A base of the present invention may be formed with any suitable structure that can be secured to a shield (in a releasable fashion) to support the shield and a bag. If it is desired that such a base be heavy to add stability to the overall apparatus comprising base and shield, the base may be made of solid material. Alternatively, a structure may be incorporated into the base to provide rigidity without requiring as much material as a solid base would need.

Referring now to the drawings, FIG. 1 presents an exemplary shield 410 of the apparatus 400 (other portions not shown). Shield 410 is made of a typical drum material with a hollow mostly cylindrical body. At an upper narrow end 401, handles 416 may be cut apertures in the barrel surface such that a hand hold may be applied on opposing sides of shield 410. Upper narrow end 401 includes upper shield opening 434 through which debris may be inserted. Debris is set into shield 410 with a bag (not shown) set around shield as described in the incorporated reference and further below. Lower wider end 402 may include a lower shield opening 439 with a lower lip 427 provided to allow for securing of a base (not shown). Making the improvement more useful, bulge 403 is supplied along the outer walls 430 so as to increase the diameter of shield 410 at a location towards the lower end. Bulge 403, in this embodiment, may include bulge face 404 which includes a regular cylindrical body extending the bulge outer circumference 468, preferably to match the lower lip 427 base coupling lip circumference 428. Bulge 403 may include a multitude of features, such as an upper bulge extension which may form a conical section or present as a flat surface alone upper bulge extending wall 405 and similarly with reverse angle on lower extending bulge wall 406. Preferably the extending walls 405 and 406 are set at between thirty and forty-five degrees relative the outer surface of shield. For example, wherein the base coupling lip circumference 428 includes a diameter of 20¾ inches, bulge outer circumference 468 would define also a 20¾ inch diameter. Preferably, bulge 403 begins approximately six to eight inches above lower lip 427 to provide for adequate functional purpose, while still allowing for stacking of shields for retail presentation and transportation. Bulge face is preferably at least four inches high, and most preferably at least eight inches in vertical height to enhance drag of bag set thereover.

The purpose of the new bulge is to ensure that the bag set thereon remains in contact with shield as shield is being removed from the bag after waste has been set therein. As described below, when the waste bag is full, the shield will be lifted out, allowing the bag to remain upright and ready for closing, tying, or otherwise sealing. When lifting the shield, the bulge maintains contact with the bag, as the outer circumference of the bulge matches the most outwardly, and largest, circumference of the lip. As the shield is lifted through, the bulge maintains contact with the bag, and pulls the bag upwards. In prior embodiments, without bulge, lifting a tapered shield would often result in kinking, folding, or otherwise misplaced bag such that the bag might fall over or not fully extend opening causing waste to be dispersed outside of the bag after collection within the apparatus. While a preferred bulge shape may include linear sections, such as the cylindrical bulge space, and tapered cylindrical upper bulge extending wall and lower bulge extending wall, forming corners 469 along edges, other embodiments of the bulge may be preferred, including one with a tubular, or toroidal form.

Figure 2A:
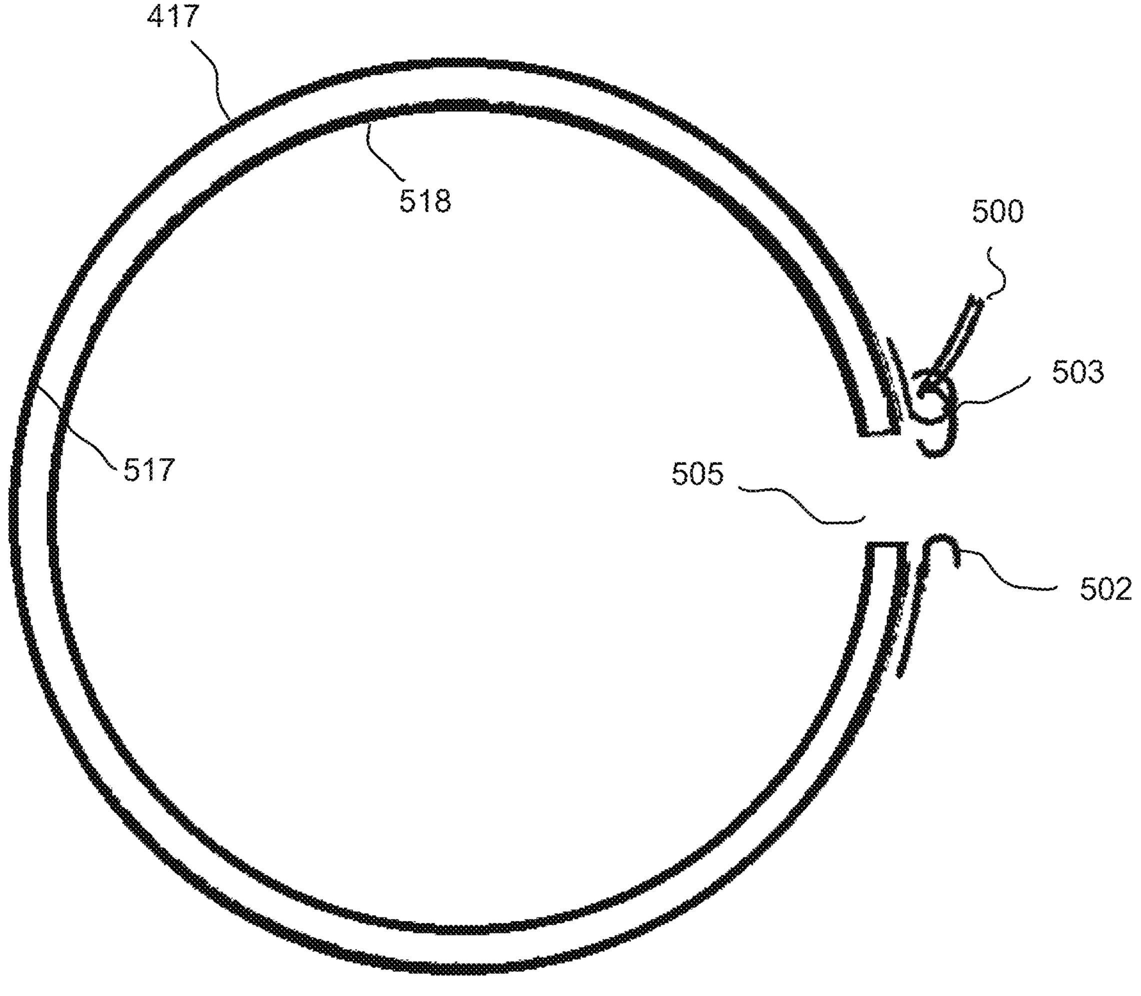
FIG. 2*a* is a top view of a retaining clip ring in open position.
Figure 2D:
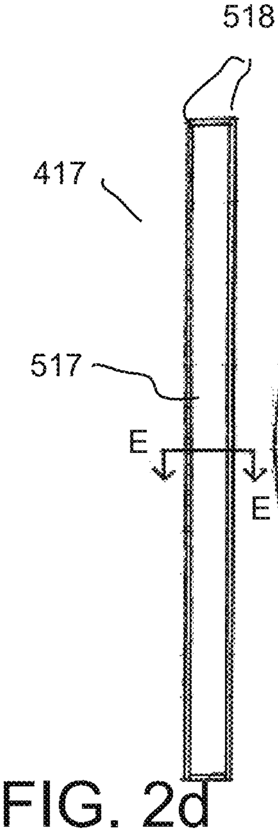
FIG. 2*d* is a side cross-sectional view along line D-D of FIG. 2*c;*
Figure 2C:
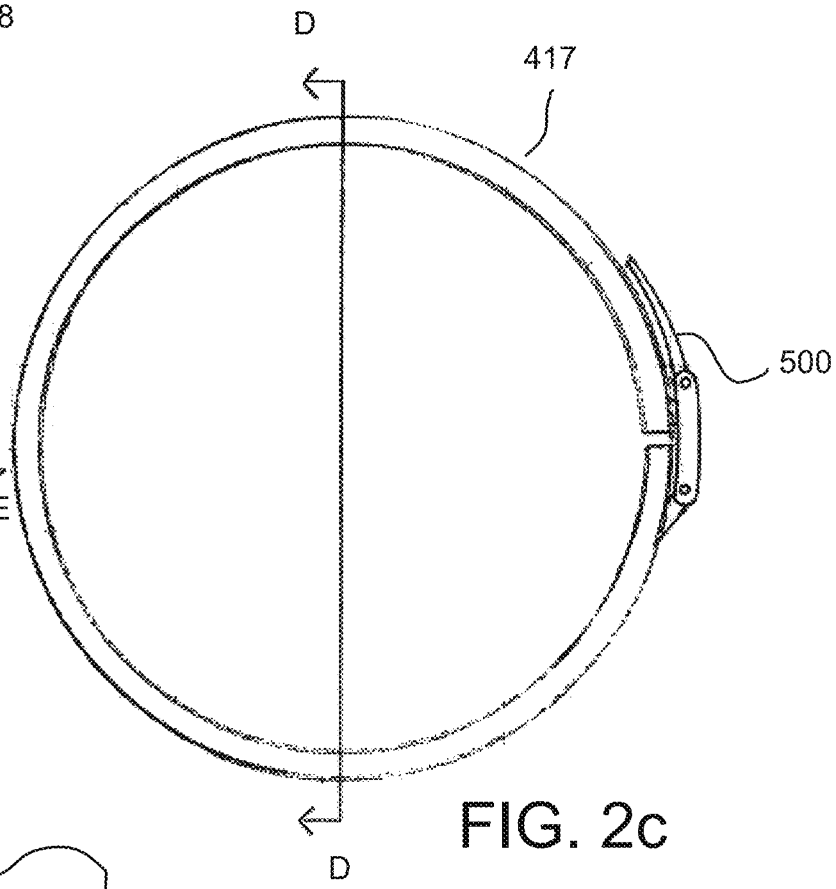
FIG. 2*c* is a top view of an alternative retaining clip ring in closed position.
Figure 2E:
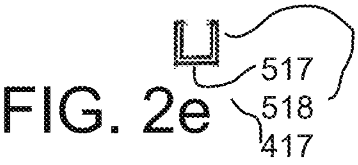
FIG. 2*e* is a side cross-sectional view along line E-E of FIG. 2*d;*
Figure 2B:
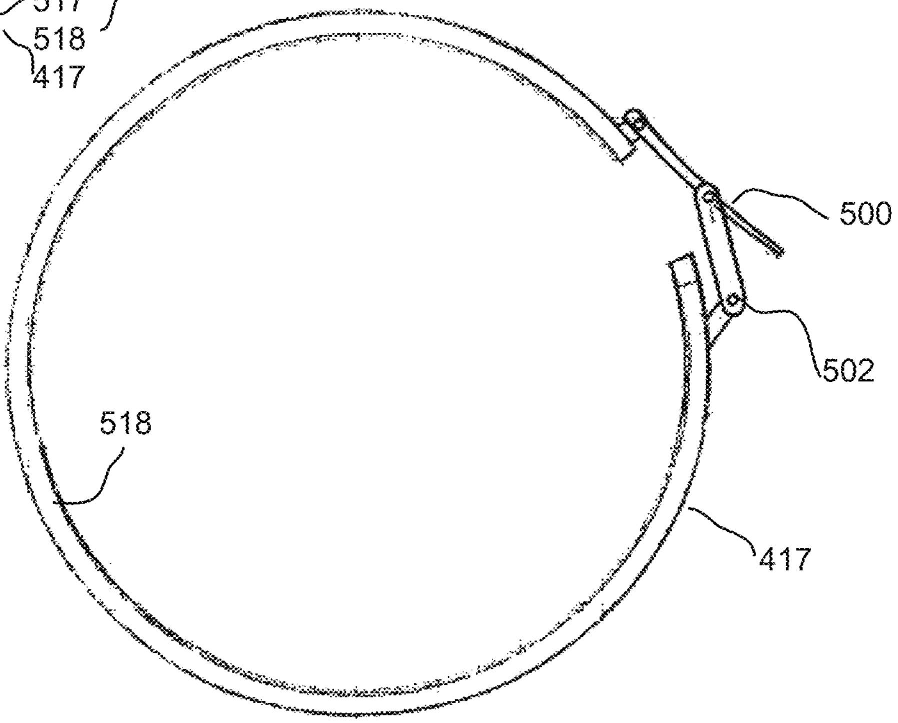
FIG. 2*b* is a top view of an alternative retaining clip ring in open position.
Figure 3:
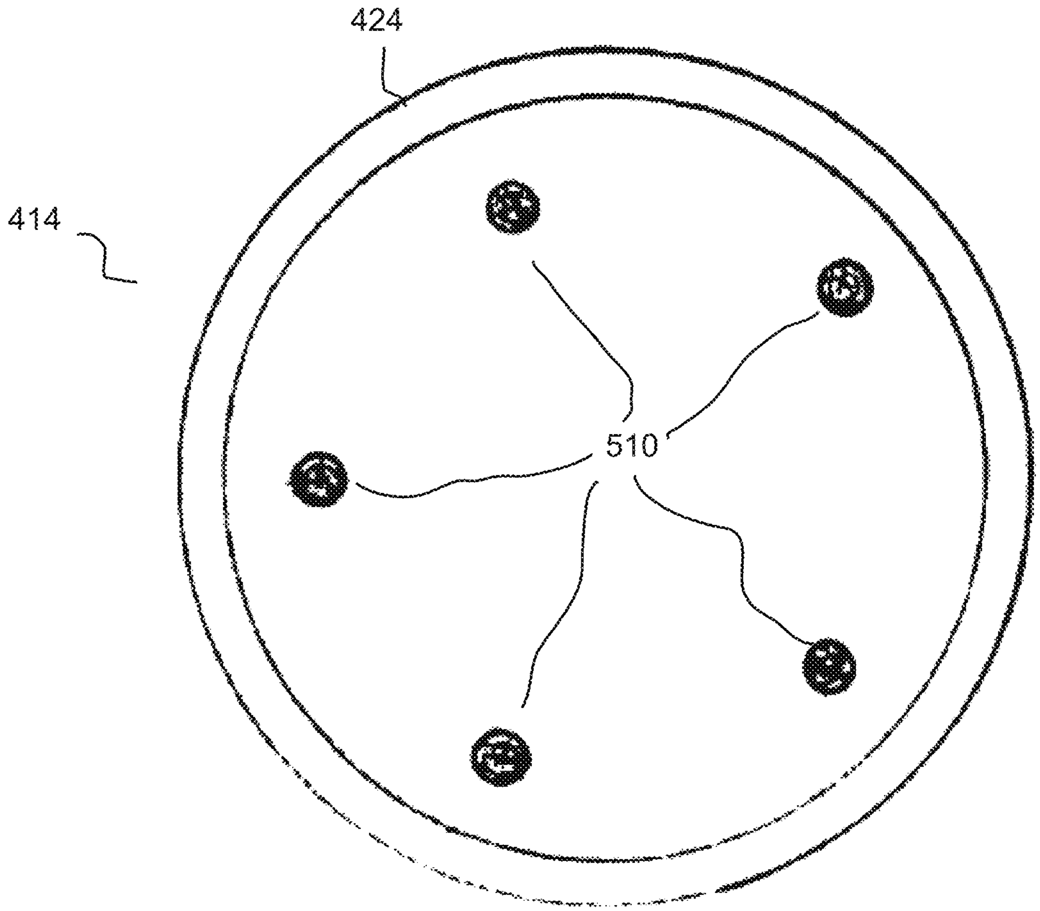
FIG. 3 is a top view of a wheel base.
Figure 4:
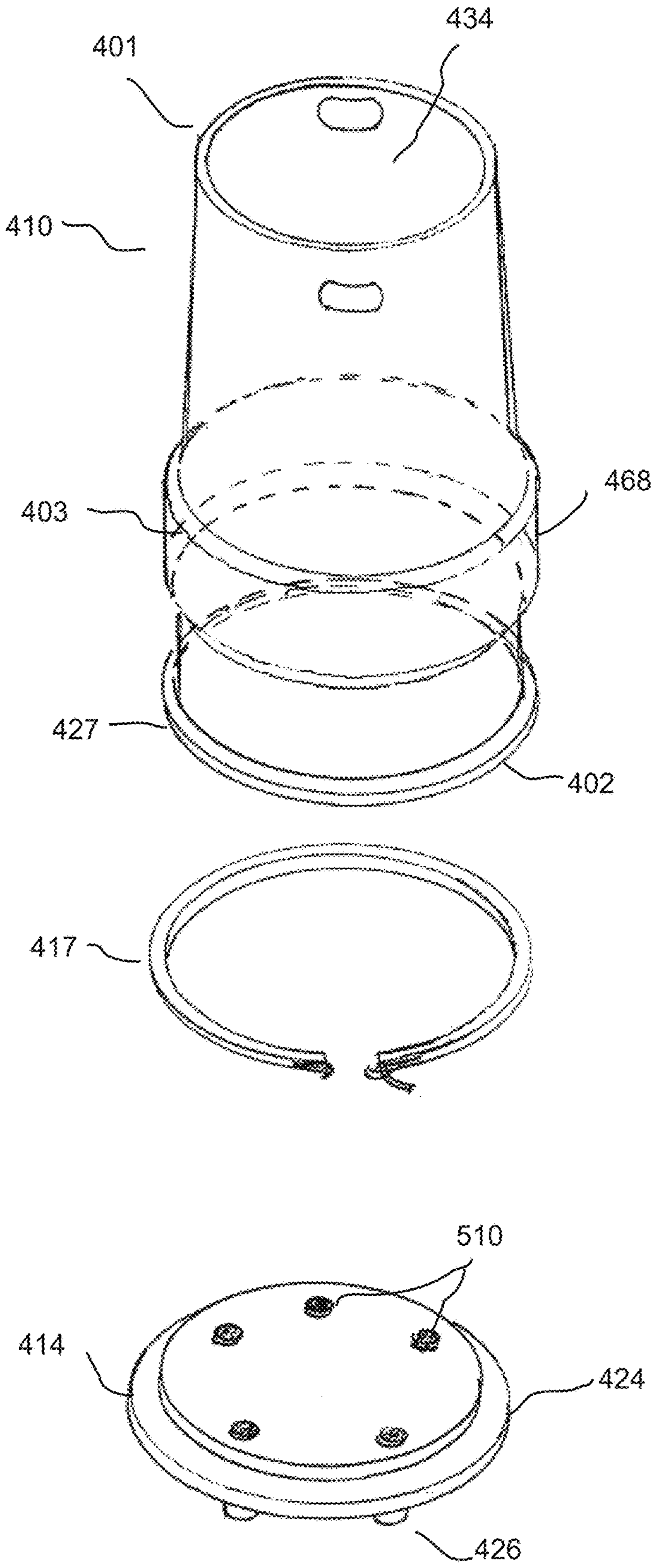
FIG. 4 is an exploded orthographic projection of a bin system of an embodiment of the present invention.

As shown in FIG. 4, shield 410 is set over base 414, and may be coupled thereby via clip ring 417. One preferred embodiment of the clip ring is shown in FIG. 2*a*. Clip ring 417 may include a handle 500 set along a first aperture 505 around ring 501. A clip 502 may be set opposite aperture so as to allow a spring biased open handle (via spring 503) to set around and secure ring. Another embodiment is shown in FIGS. 2*b*, 2*c*, 2*d*, and 2*e* with various views and positions. As seen in FIG. 2*b*, standard clip 502 around ring 501 is shown with handle open in an open position. FIG. 2*c* demonstrates a top view of the same clip ring 417 in a closed position, with handle 500 set against clip ring surface. To better understand the shape of clip ring 417, a cross-sectional view is shown in FIG. 2*d* along lines D-D of FIG. 2*c*. As seen in FIG. 2*d*, a side internal view of the clip ring demonstrates that the ring may be simple with a single vertical body, such as a cylindrical body set around various features of the shield and base. As seen along lines E-E of FIG. 2*d*, FIG. 2*e* shows the C-clamp nature of the clip ring. The vertical cylindrical portions of body 517 include inwardly extending ring bodies 518 to allow for clip ring to be set over lower lip and base coupling lips (shown in other figures).

Base 414 preferably includes a base coupling lip 424 extending along the outer perimeter thereof, and defining a base coupling lip circumference 428. A set of wheels 426, preferably multiple wheels, such as in an array of five caster wheels as shown are set equidistance and along the outer perimeter of base body. Wheels are provided on base to allow the assembled apparatus to be mobile and rolled to facilitate collection of waste/debris spread over an area. As shown in FIG. 4, shield 410 is set over base 414, and clip ring 417 is applied around lower portion of shield body and the extending rim of base. Not shown, is the waste receptacle bag which can be fitted onto base, and secured between shield and base, allowing it to be lifted up around shield body for application of waste into shield set within bag. It is also possible to simply fill up shield while bag is secured between shield and base, and only thereafter lift up bag with the shield. In such instance, a bag will be set over the base, and secured with the shield set thereover, to allow for waste to be set within shield. Bag need only be raised upward around bulge so that shield may be gripped by handle and lifted up while bulge captures or secures bag and slidably engages to lift and pull bag up to surround waste that had been within the shield that is now secured within the extended bag. Bag is extended as shield is lifted.

As seen in FIG. 5, shield 410 with handles 416 shown in cross-section may be set over base 414 with clip ring 417 set around base coupling lip 424 and lower lip 427. Clip ring body 517 includes inwardly extending rims 518 to secure lips together. Clip ring being tightened around circumference allows for securing base to shield. Wheel 426 may be secured by wheel mount to base 414 via wheel mounts 510 set vertically through base with fasteners as is known in the art.

Figure 6:
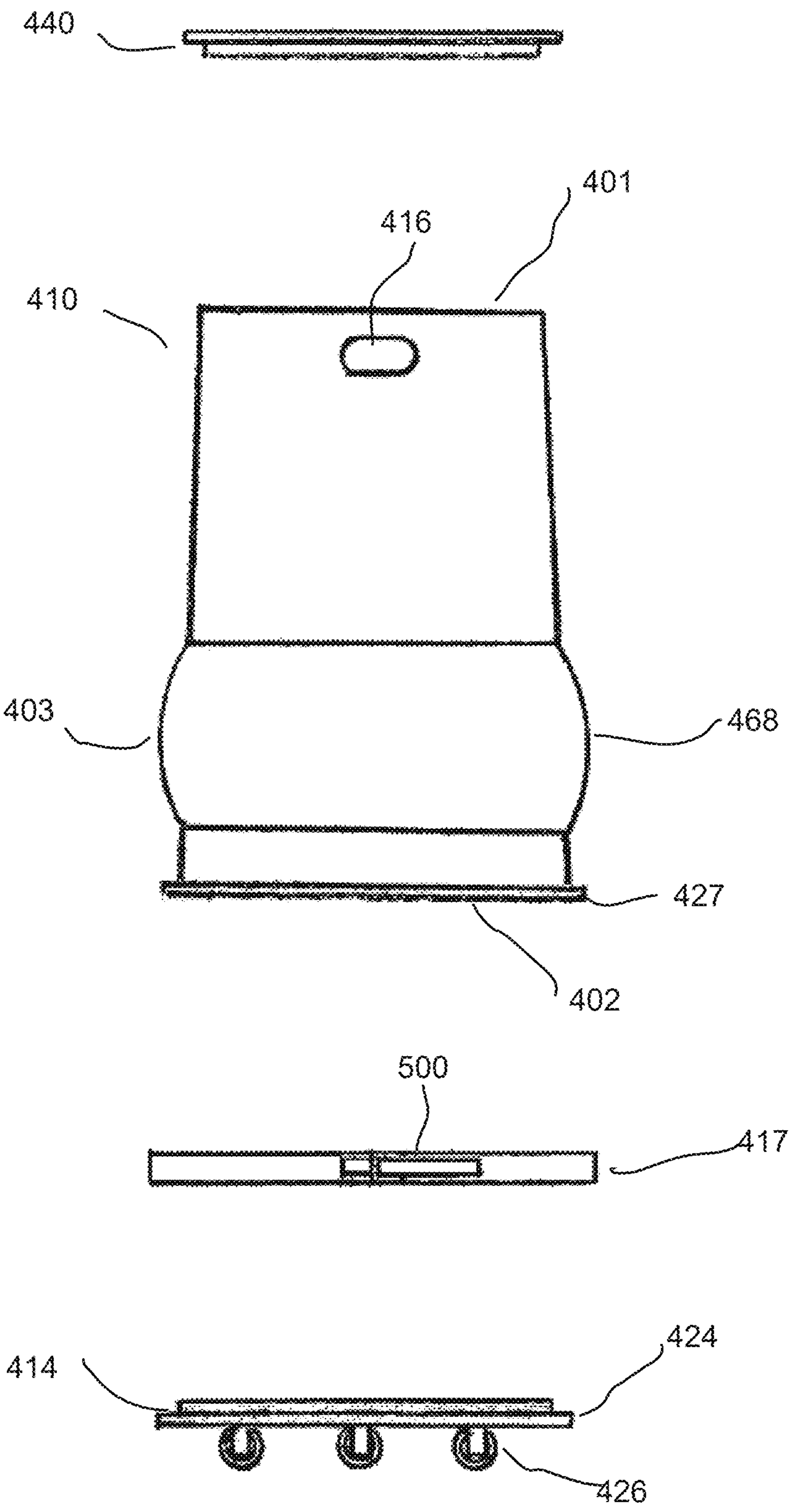
FIG. 6 is an exploded side view of a bin system of the present invention.
Figure 7:
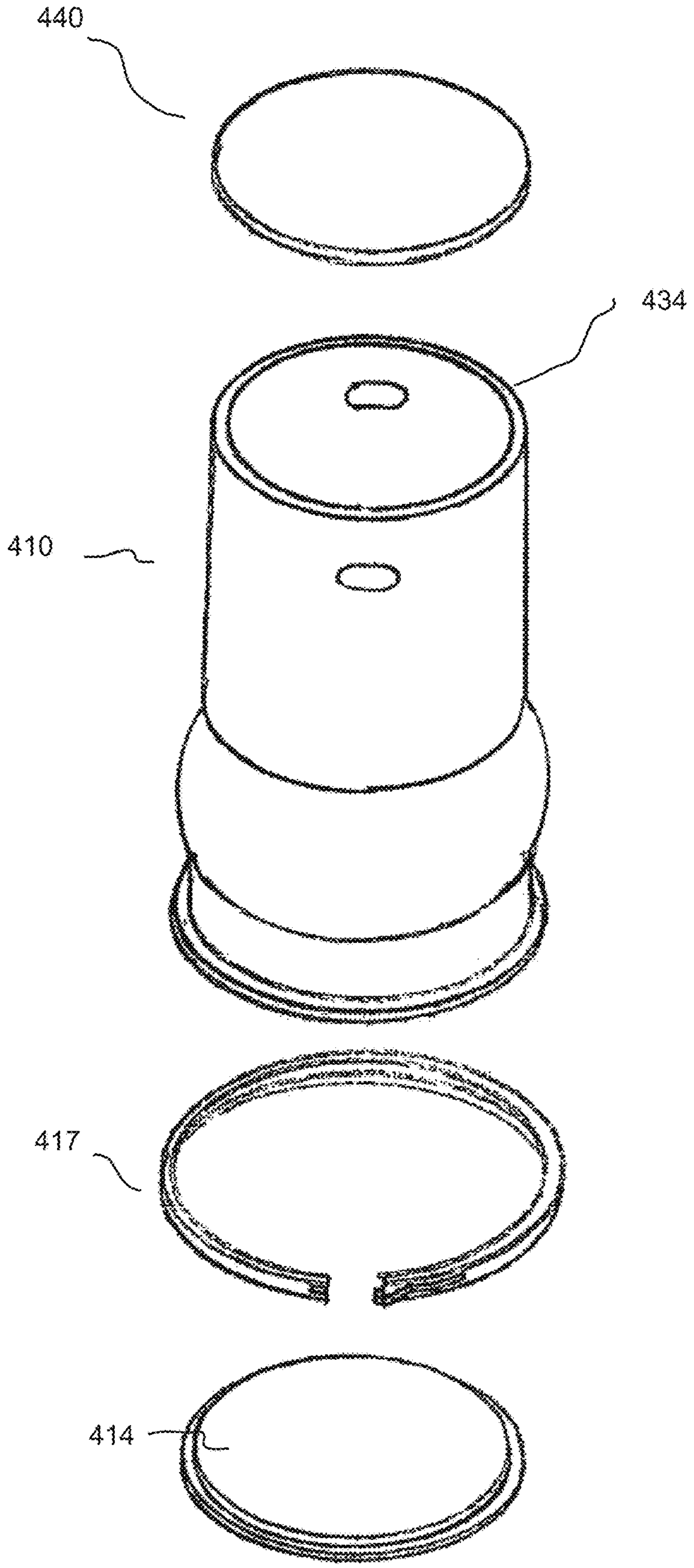
FIG. 7 is an exploded orthographic projection of an alternative bin system of an embodiment of the present invention.
Figure 8:
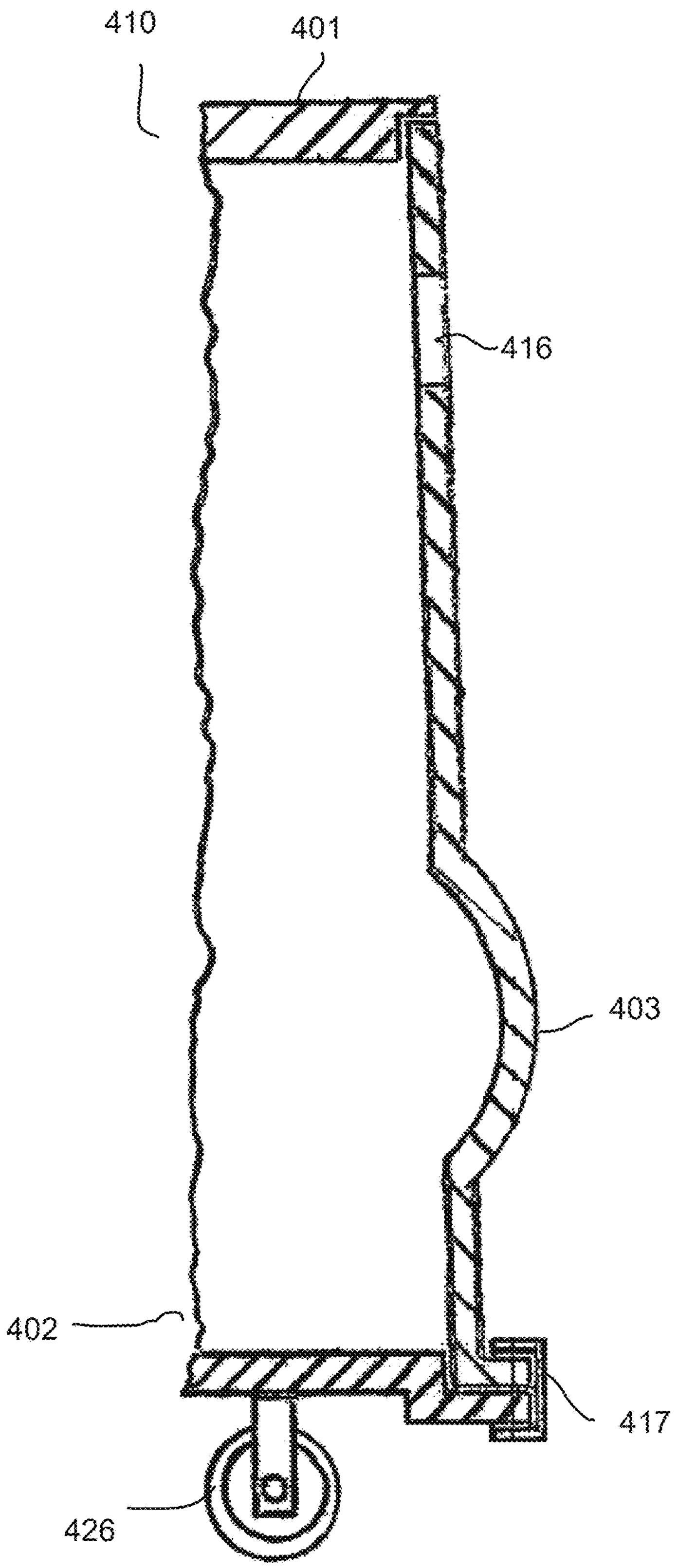
FIG. 8 shows cutaway side view of the lower portion of an alternative bin system of the present invention.
Figure 9:
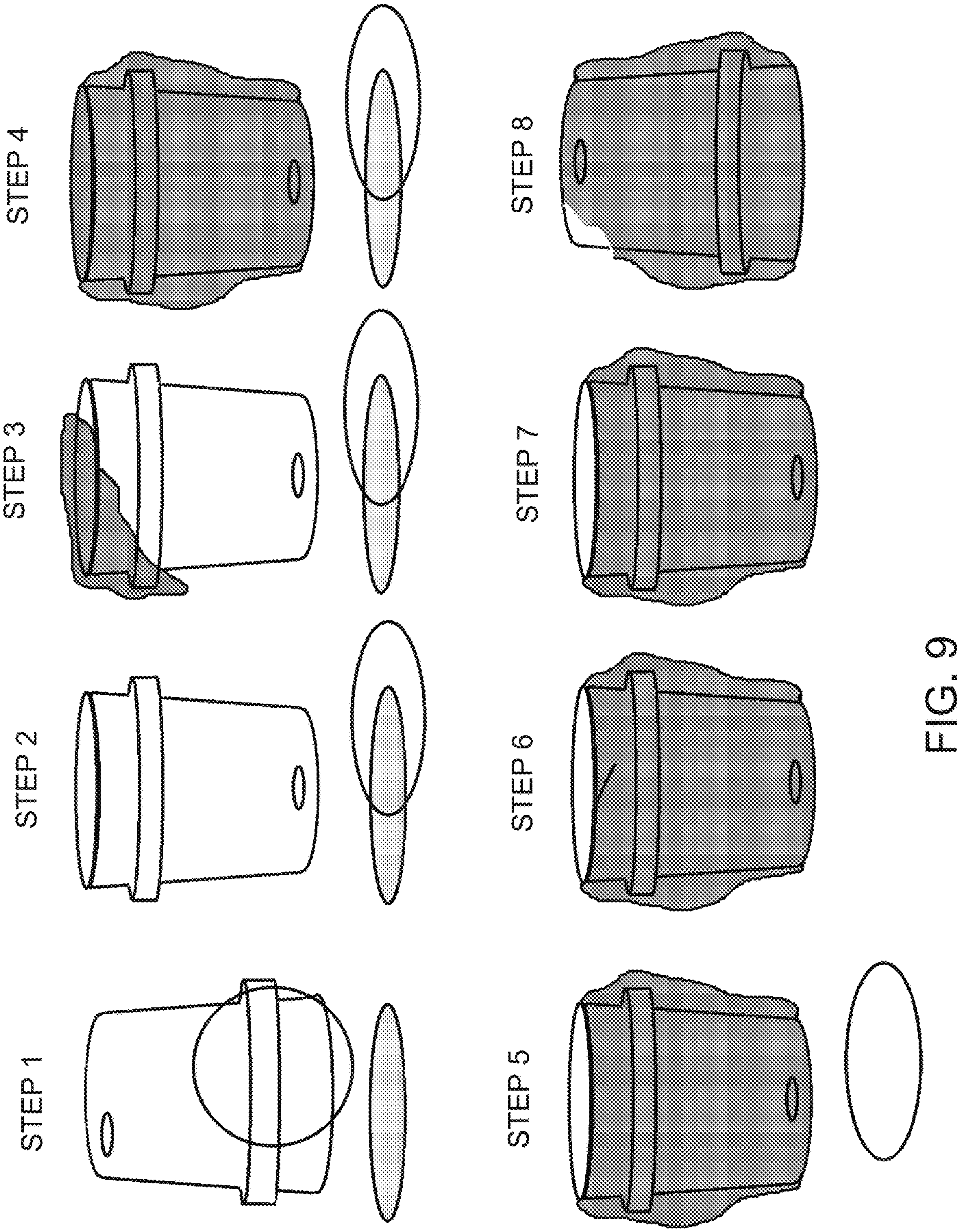
FIG. 9 is a diagrammatic multi-step instruction for use of an embodiment of the present invention in eight steps.

An alternative embodiment of the present invention is shown in FIG. 6 wherein shield 410 includes a bulge 403 of a toroidal or otherwise rounded shape. The shield may simply include a change into the shape of its tapered cylindrical body, or a bulge may be applied on the outside of the shield body. Shield 410 may be set over base 414 and clip ring secured therearound. An additional body, the cap 440 may be secured over shield 410 to allow for transportation or storage of waste set therein. An alternative use for cap 440 is to allow the top of the apparatus to serve as a horizontal working surface. Cap preferably includes outer rim 441 with an inner body 442 extending within upper shield opening 434. Cap may be secured thereon or clipped thereon, or may simply rest by gravity over upper narrow end.

Figure 10:
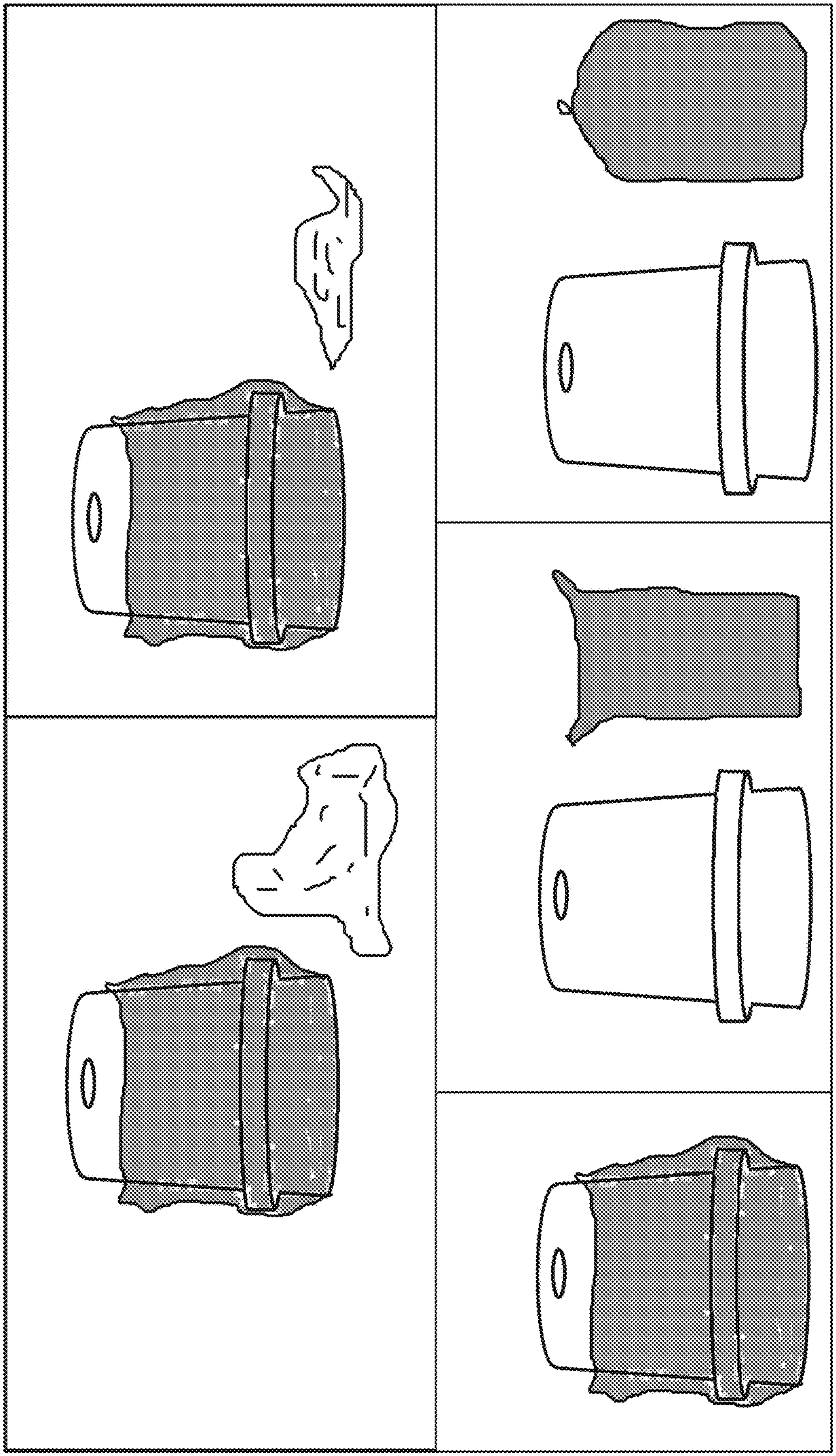
FIG. 10 is a diagrammatic multi-step demonstration for use of an embodiment of the present invention in five steps.

Viewing an exemplary embodiment and step-by-step instructions for use of the apparatus, apparatus 400 is shown in FIG. 10. FIG. 10 provides an eight step diagrammatic view of use of the shield 410, clip ring 417, base 414. Initially, in Step 1, the three components of the full packed trash can, include the sleeve, base, and retention ring. In this view, sleeve serves as shield, and retention ring is clip ring. To begin application of bag, Step 2 demonstrates that sleeve, or shield, will be inverted, whereby handles 416 along upper narrow end 401 are set towards the ground. Step 3, a plastic trash bag or other waste receiving bag may be set around lower wider end 402 and in Step 4 shown, trash bag may be pulled down over the inverted sleeve or shield. Step 5 demonstrates that the base may be inverted and placed over lower wider end 402 to seal and secure thereon. In Step 6, the base is set in place and a retention ring, or clip ring, is set around the lips of the shield and base to allow securing of the base to the shield. In Step 7, the clasps of the retention ring, or clip ring, are secured tightly to ensure the base does not disengage shield. For Step 8, the system is reverted, or inverted, from the prior inverted position, to assemble the apparatus as a trash can. The plastic bag may be pulled upwards or dropped downwards to be caught along the outer bulge. The waste then may be entered into the upper shield opening 434 until full, or adequately filled, so that shield may then be removed upwardly while base is set on the ground. The weight of the waste materials pressed down on the bag inserted between the waste and the base with the shield set around, hold the bag and base down as the shield may be lifted up once the retaining clip is removed. By lifting the shield up, the waste in the bag holds it down so that the shield may be fully removed and the waste bag full of material is set upright with waste set therein.

A further demonstration is shown in FIG. 11 with a five step view of the waste entry and shield removal. As seen in top left, apparatus is assembled with bag set around shield and over base. Waste, here shown as leaves, may be filled into the upper shield opening and may be pressed down and compacted without fear of ripping the sidewalls of the bag. As shown in lower left, once filled, the bag may have sagged lower and may not be high enough to secure all the waste that is set within the shield. As shield is lifted, the bulge interfaces with the bag in a surface to lift and secure the bag in an upright position so that all the waste material is secured within the upright bag shown in the bottom middle. This allows for sealing, or closing the bag, with all the waste collected set therein.

While the present invention has been described in terms of several preferred embodiments, it is contemplated that alterations and permutations thereof will become apparent to those skilled in the art upon a reading of the specification and study of the drawings. For example, the shield and base may be varied and still fall within the intent of the claims appended hereto. The present invention is intended to be defined only by the recited limitations of the claims, and equivalents thereof, rather than by the above description of preferred exemplary embodiments.

I claim:

1. An apparatus for supporting a bag on a surface and for protecting the bag during compacting of waste into the bag, the apparatus comprising:

(a) a shield having an upper shield opening and a lower shield opening, and a central body with a circumferential bulge expanding a local diameter of the shield; wherein said shield comprises a generally tapered conical shape; wherein said shield comprises a lower outer diameter;

(b) abase; and (c) a releasable ring clip, including a latch, for securing the base, in a releasable fashion, to the lower shield opening around an extended lip set around said lower shield opening, said extending lip defining the lower outer diameter;

wherein the circumferential bulge extends the local diameter equal to said lower outer diameter.

2. The apparatus of claim 1 wherein the ring clip is circular.

3. The apparatus of claim 1 wherein the ring clip is channeled.

4. The apparatus of claim 1 wherein the circumferential bulge is set at least two inches above the lower shield opening.

5. The apparatus of claim 1 wherein the circumferential bulge is at least six inches above the lower shield opening.

6. A system for supporting a bag on a surface and for protecting the bag during compacting of waste into the bag, the system comprising:

(a) a shield having an upper shield opening and a lower shield opening, and a central body with a circumferential bulge expanding a local diameter of the shield, wherein said shield comprises a generally tapered conical shape, the circumferential bulge extending the local diameter to at least a diameter of a flange or lower lip;

(b) a bag positioned outside the shield such that the shield is at least partially inside the bag;

(c) a base adapted to be secured to the lower shield opening in a releasable fashion and positioned outside the bag; and (d) a releasable ring clip, including a latch, the clip securing the base, in a releasable fashion, to the lower shield opening.

7. The system of claim 6 wherein the ring clip is circular.

8. The system of claim 6 wherein the ring clip is channeled.

9. The system of claim 6 wherein the circumferential bulge is set at least two inches above the lower shield opening.

10. The system of claim 6 wherein the circumferential bulge is at least six inches above the lower shield opening.

11. The system of claim 6 further comprising at least one handle aperture set along a surface of the shield below the upper shield opening and above the circumferential bulge local diameter.

12. The system of claim 11 wherein a handle diameter at a height of the at least one handle aperture is less than the local diameter and greater than an upper diameter.

13. A system for supporting a bag on a surface and for protecting the bag during compacting of waste into the bag, the system comprising:

(a) a shield comprising a generally tapered conical shape, said shield having an upper shield opening and a lower shield opening, and a central body with a circumferential bulge expanding a local diameter of the shield; the shield comprising a lower diameter;

a circumferentially extending lip along the lower shield opening, said lip defining an extended diameter;

wherein the local diameter is equal to the extended diameter.

* * * * *